United States Patent [19]
Kawaguchi et al.

[11] Patent Number: 5,738,420
[45] Date of Patent: Apr. 14, 1998

[54] SPIN SUPPRESS CONTROL DEVICE OF VEHICLE OPERATIVE WITH YAW MOMENT FREE PRECAUTION BRAKING

[75] Inventors: Hiroshi Kawaguchi; Akio Okada, both of Mishima, Japan

[73] Assignee: Toyota Jidosha Kabushiki Kaisha, Toyota, Japan

[21] Appl. No.: 680,043

[22] Filed: Jul. 15, 1996

[30] Foreign Application Priority Data

Aug. 25, 1995 [JP] Japan ................... 7-240559

[51] Int. Cl.⁶ ........................ B00T 13/74
[52] U.S. Cl. .................. 303/146; 364/426.028; 364/426.016
[58] Field of Search ................. 303/146, 147, 303/148, 125, 187, 188; 364/426.027, 426.028, 426.023, 426.016

[56] References Cited

U.S. PATENT DOCUMENTS

| | | | |
|---|---|---|---|
| 5,267,783 | 12/1993 | Inoue et al. | 303/146 |
| 5,333,058 | 7/1994 | Shiraishi et al. | 303/146 X |
| 5,428,532 | 6/1995 | Yasuno | 303/146 X |

FOREIGN PATENT DOCUMENTS

| | | |
|---|---|---|
| 41 23 235 | 11/1992 | Germany. |
| A-3-112754 | 5/1991 | Japan. |
| A-6-24304 | 2/1994 | Japan. |
| A-6-99800 | 4/1994 | Japan. |
| A-7-89427 | 4/1995 | Japan. |

*Primary Examiner*—Lee W. Young
*Attorney, Agent, or Firm*—Oliff & Berridge, PLC

[57] ABSTRACT

A spin suppress control device of a vehicle estimates a spin quantity of the vehicle to represent a liability of its spinning, and selectively and variably brakes each of the wheels according to the spin quantity so as to decelerate the vehicle within a range of generating no substantial yaw moment in the vehicle when the spin quantity exceeds a first threshold value therefor, and provides the vehicle with an anti-spin moment when the spin quantity exceeds a second threshold value therefor greater than the first threshold value.

6 Claims, 6 Drawing Sheets

SPIN SUPPRESS CONTROL DEVICE OF VEHICLE OPERATIVE WITH YAW MOMENT FREE PRECAUTION BRAKING

BACKGROUND OF THE INVENTION

1. Field of the Invention

The present invention relates generally to a behavior control of a vehicle such as an automobile for improving the running stability thereof, and more particularly, to a spin suppress control device for more desirably suppressing the vehicle from spinning with a yaw moment free precaution control against the spinning.

2. Description of the Prior Art

It is well known that the automobiles and the like vehicles are, when unduly steered, liable to a "spin", because the side force applied to the vehicle body as a centrifugal force can increase with no limit along with increase of vehicle speed and steering angle, while the tire grip force for holding the vehicle body from the road surface against the side force is limited, particularly to be less on a slippery wet road.

Various endeavors have been made to suppress the automobiles and the like vehicles from spinning. There are those described in Japanese Patent Laid-open Publications 3-112754, 6-24304 and 6-99800, for example.

In similar endeavors for further improving the vehicle behavior against spinning, the present inventors have noted that, in executing a spin suppress control by selectively and variably braking the wheels of the vehicle so as to generate an anti-spin moment in the vehicle, there is an inconvenience that the limit of tire grip force of some of the wheels is exceeded by the increase of side force due to the braking thereof, so that the intended spin suppress control is not available.

SUMMARY OF THE INVENTION

In view of the above inconvenience, it is a principal object of the present invention to provide a more improved spin suppress control device of a vehicle such as an automobile which operates with a precaution stage of applying a provisional braking to the wheels at a relatively early stage of a spin being anticipated, with no substantial generation of yaw moment in the vehicle by the provisional braking.

According to the present invention, the above-mentioned object is accomplished by a spin suppress control device of a vehicle having a vehicle body and wheels, comprising a means for estimating a spin quantity of the vehicle to represent a liability of a spinning thereof, and a means for selectively and variably braking each of said wheels according to said spin quantity, wherein the device actuates said braking means so as to decelerate the vehicle within a range of generating no substantial yaw moment in the vehicle by the actuation of said braking means when said spin quantity exceeds a first threshold value therefor, and to provide the vehicle with an anti-spin moment when said spin quantity exceeds a second threshold value therefor greater than said first threshold value.

By the spin suppress control device being so constructed that the wheels are selectively and variably braked to decelerate the vehicle within a range of generating no substantial yaw moment in the vehicle by the braking when a liability of a spinning of the vehicle is anticipated at a certain threshold level, the threshold level for executing such a precaution braking of the wheels may be determined at a relatively low level so that at a relatively early stage of a rising of a liability of a spinning the precaution braking is executed, as the driver will be caused no substantial inconvenience such as a need for adapting the steering to the automatic braking of the vehicle executed with no consent of the driver. Since the spin moment generated in the vehicle is proportional to the vehicle speed, it will often be possible that the liability of a spinning is extinguished by such a precaution braking being triggered by a relatively low level of liability of a spinning such as checked by said first threshold value and executed to any desired extend to suppress the liability of a spinning within a range which causes no substantial change of the yaw moment by the braking. Further, even when the spin suppress control proceeds further to the second stage of providing the vehicle with an anti-spin moment by said spin quantity still exceeding said second threshold value, the tire grip condition of each wheel will be maintained at a more desirable condition.

According to a more detailed feature of the present invention, the spin suppress control device may comprise a means for detecting a value of the slip ratio at a point of contact of each of said wheels with a road surface, a means for estimating a radius of the friction circle at each of said contact points, a means for estimating a side force acting to each of said wheels from the road surface, a means for calculating a slip allowance of each of said wheels as a difference between said radius value of the friction circle and said side force with respect to each of said wheels, and a means for calculating a target value of the slip ratio of each of said wheels as a sum of each of said detected values of the slip ratio and a modification value based upon the minimum of said slip allowances, and may brake each of said wheels such that the slip ratio of each of said wheels is brought to said target value therefor when said spin quantity exceeds said first threshold value.

According to a still further detailed feature of the present invention, said modification value may be a product of said slip allowance and a proportional factor which is increased according to increase of said spin quantity.

According to a still further detailed feature of the present invention, the vehicle my be provided with said anti-spin moment by one of said wheels located at a front outside of the vehicle in a turn thereof is particularly braked.

In relation to each of the above-mentioned detailed futures of the present invention, said spin quantity may be such a quantity that is equal to a weighted sum of a value of the slip angle of the vehicle body and a time-based differential of said slip angle when said weighted sum is positive, and is equal to the absolute value of said weighted sum when said weighted sum is negative.

Or, alternatively, said spin quantity may be modified to be such a quantity that is equal to a weighted sum of a value of the slip angle of the vehicle body and a time-based differential of said slip angle when said weighted sum is positive in conformity with the yaw rate of the vehicle being positive but is zero when said weighted sum is negative against the positive yaw rate, and is equal to the absolute value of said weighted sum when said weighted sum is negative in conformity with the yaw rate being negative but is zero when said weighted sum is positive against the negative yaw rate.

BRIEF DESCRIPTIONS OF THE DRAWING

In the accompanying drawings.

DESCRIPTION OF THE EMBODIMENTS

In the following, the present invention will be described in more detail in the form of some preferred embodiments with reference to the accompanying drawings.

Figure 1:
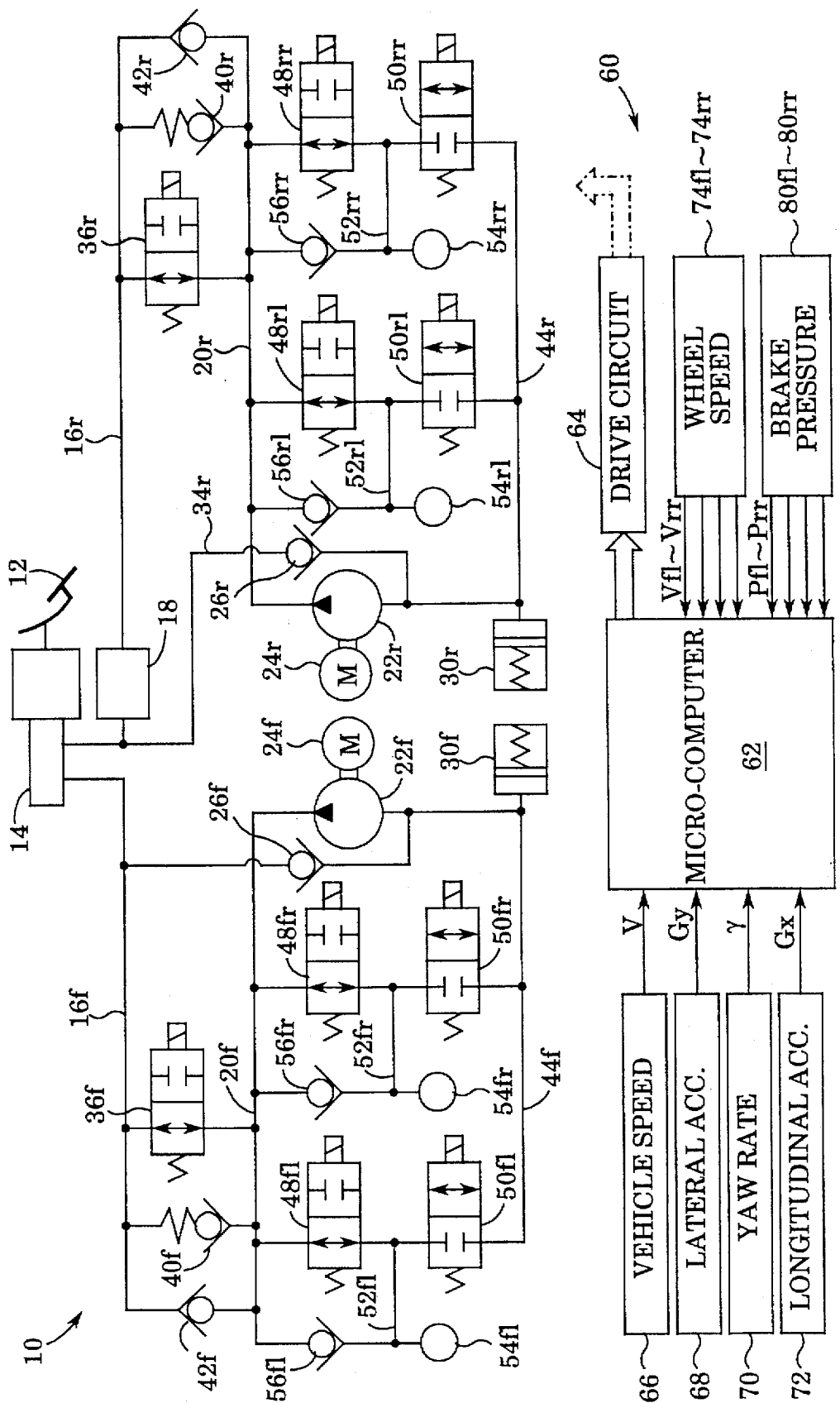
FIG. 1 is a diagrammatic illustration of hydraulic circuit means and electrical control means of an embodiment of the spin suppress control device according to the present invention, with a partial modification thereof being also shown in the same figure.

First referring to FIG. 1 showing diagrammatically an embodiment of the spin suppress control device of the present invention with regard to the constructions of its hydraulic circuit means and its electric control means, the hydraulic circuit means generally designated by 10 comprises a conventional foot brake pressure source means including a brake pedal 12 to be stepped on by a driver and a master cylinder 14 adapted to generate a foot brake pressure according to the stepping-on of the brake pedal 12. 54fl, 54fr, 54rl and 54rr are wheel cylinders for applying braking actions to front left, front right, rear left and rear right wheels not shown in the figure, respectively, according to a hydraulic pressure supplied thereto. The wheel cylinder 54fl is connected with a middle point of a serial connection of a normally open type on-off valve 48fl and a normally closed type on-off valve 50fl by a connection passage 52fl. Similarly, wheel cylinders 54fr, 54rl and 54rr are connected with related normally open type on-off valves 48fr, 48rl and 48rr, and normally closed type on-off valves 50fr, 50rl and 50rr, with connection passages 52fr, 52rl and 52rr, respectively, in the same manner.

An inlet side of each of the on-off valves 48fl and 48fr is connected with a high pressure passage 20f so as to be supplied with the delivery of a pump 22f adapted to be driven by a motor 24f. Similarly, an inlet side of each of normally open type on-off valves 48rl and 48rr is connected with a high pressure passage 20r so as to be supplied with the delivery of a pump 22r adapted to be driven by a motor 24r. An outlet side of each of the normally closed on-off type valves 50fl and 50fr is connected with a drain passage 44f leading to a reservoir 30f. Similarly, an outlet side of each of the normally closed type on-off valves 50rl and 50rr is connected with a drain passage 44r leading to a reservoir 30r. The wheel cylinders 54fl and 54rl are also connected with the high pressure passage 20f via non return valves 56fl and 56fr, respectively, these non return valves being oriented to allow the brake fluid to flow only from the side of the wheel cylinder to the side of the high pressure passage. Similarly, the wheel cylinders 54rl and 54rr are connected with the high pressure passage 20r via non return valves 56rl and 56rr, respectively, these non return valves being oriented to allow the brake fluid to flow only from the side of the wheel cylinder to the side of the high pressure passage.

The high pressure passage 20f is connected with a pedal pressure passage 16f extending from a first delivery port of the master cylinder 14 via a changeover valve 36f so that when the changeover valve 36f is in its first changeover position shown in the figure, the high pressure passage 20f is in communication with the first delivery port of the master cylinder, while when the changeover valve 36f is in its second changeover position opposite to that shown in the figure, the high pressure passage 20f is isolated from the first delivery port of the master cylinder. The pedal pressure passage 16f is connected with the high pressure passage 20f also via a biased non return valve 40f oriented to be able to allow the brake fluid to flow only from the side of the high pressure passage 20f to the side of the pedal pressure passage 16f and a non return valve 42f oriented to allow the brake fluid to flow only from the side of the pedal pressure passage 16f to the side of the high pressure passage 20f. The suction side of the pump 22f is connected with the pedal pressure passage 16f via a non return valve 26f oriented to allow the brake fluid to flow only from the suction side of the pump 22f toward the pedal pressure passage 16f. Similarly, the high pressure passage 20r is connected with a pedal pressure passage 16r extending from a second delivery port of the master cylinder 14 through a proportioning valve 18 via a changeover valve 36r so that when the changeover valve 36r is in its first changeover position shown in the figure, the high pressure passage 20r is in communication with the second delivery port of the master cylinder, while when the changeover valve 36r is in its second changeover position opposite to that shown in the figure, the high pressure passage 20r is isolated from the second delivery port of the master cylinder. The pedal pressure passage 16r is also connected with the high pressure passage 20r via a biased one way valve 40r oriented to allow the brake fluid to flow only from the side of the high pressure passage 20r to the side of the pedal pressure passage 16r and a non return valve 42r oriented to allow the braking fluid to flow only from the side of the pedal pressure passage 16r to the side of the high pressure passage 20r. The second delivery port of the master cylinder is also connected with the intake side of the pump 22r via a non return valve 26r oriented to allow the brake fluid to flow only from the intake side of the pump toward the second delivery port of the master cylinder.

When the changeover valves 36f and 36r are changed over in the first changeover position thereof, with the normally open type on-off valves 48fl, 48fr, 48rl and 48rr being open as shown in the figure, while the normally closed type on-off valve 50fl, 50fr, 50rl and 50rr being closed as shown in the figure, with the pumps 22f and 22r being stopped, the wheel cylinders 54fl, 54fr, 54rl and 54rr are placed under the normal control of the brake pedal 12 so that the braking force applied to each of the wheels is varied according to the stepping on amount of the brake pedal 12. When the changeover valves 36f and 36r are changed over to the second changeover positions thereof so as to cut the connection between the pedal pressure passages 16f and 16r and the high pressure passages 20f and 20r through the changeover valves 36f and 36r, respectively, while the pumps 22f and 22r are driven by the motors 24f and 24r, respectively, the hydraulic pressure in each of the wheel cylinders 45fl–45rr is varied according to the ratio of the opening period of the corresponding normally open type on-off valve 48fl, etc. and the opening period of the normally closed type on-off valve 50fl, etc., i.e. the duty ratio of the alternate changeover of the on-off conditions of the corresponding normally open type on-off valve and the corresponding normally closed type on-off valve. Thus, in the automatic braking of the wheels by the spin suppress control device of the present invention, the braking of each wheel is controlled according to the duty ratio of the alternate changeover of each corresponding pair of the normally open type on-off valve and the normally closed type on-off valve.

The changeover valves 36f and 36r, normally open type on-off valves 48fl, 48fr, 48rl, 48rr, normally closed type on-off valves 50fl, 50fr, 50rl, 50rr, and motors 24f and 24r are all controlled by the electric control means 60 as described in detail hereinbelow. The electric control means 60 consists of a micro-computer 62 and a driving circuit means 64. Although not shown in detail in FIG. 1, the micro-computer 62 may have a general construction including a central processing unit, a read only memory, a random access memory, input and output port means and a common bus interconnecting these functional elements.

The input port means of the micro-computer 62 is supplied with a signal showing vehicle speed V from a vehicle speed sensor 66, a signal showing lateral acceleration Gy of the vehicle body from a lateral acceleration sensor 68 mounted substantially at a mass center of the vehicle body, a signal showing yaw rate γ of the vehicle body from a yaw rate sensor 70, a signal showing longitudinal acceleration Gx of the vehicle body from a longitudinal acceleration sensor 72 mounted substantially at the mass center of the vehicle body, and signals showing wheel speed (wheel circumferential speed) Vfl, Vfr, Vrl, Vrr of front left and front right wheels and rear left and rear right wheels from wheel speed sensors 74fl, 74fr, 74rl, 74rr, respectively, or, as a substitute therefor, signals showing brake pressure Pfl, Pfr, Prl, Prr of the wheel cylinders of the front left and front right wheels and the rear left and rear right wheels from brake pressure sensors 80fl, 80fr, 80rl, 80rr. The lateral acceleration sensor 68 and the yaw rate sensor 70 detect lateral acceleration Gy and yaw rate γ, respectively, to be positive when the vehicle makes a left turn, and the longitudinal acceleration sensor 72 detects longitudinal acceleration Gx to be positive when the vehicle is accelerated in the forward direction. In general, in the following analyses, the parameters which are distinctive of the direction of turn of the vehicle are each assumed to be positive when the turn is anti-clockwise and negative when the turn is clockwise, as viewed from the top of the vehicle.

Figure 2:
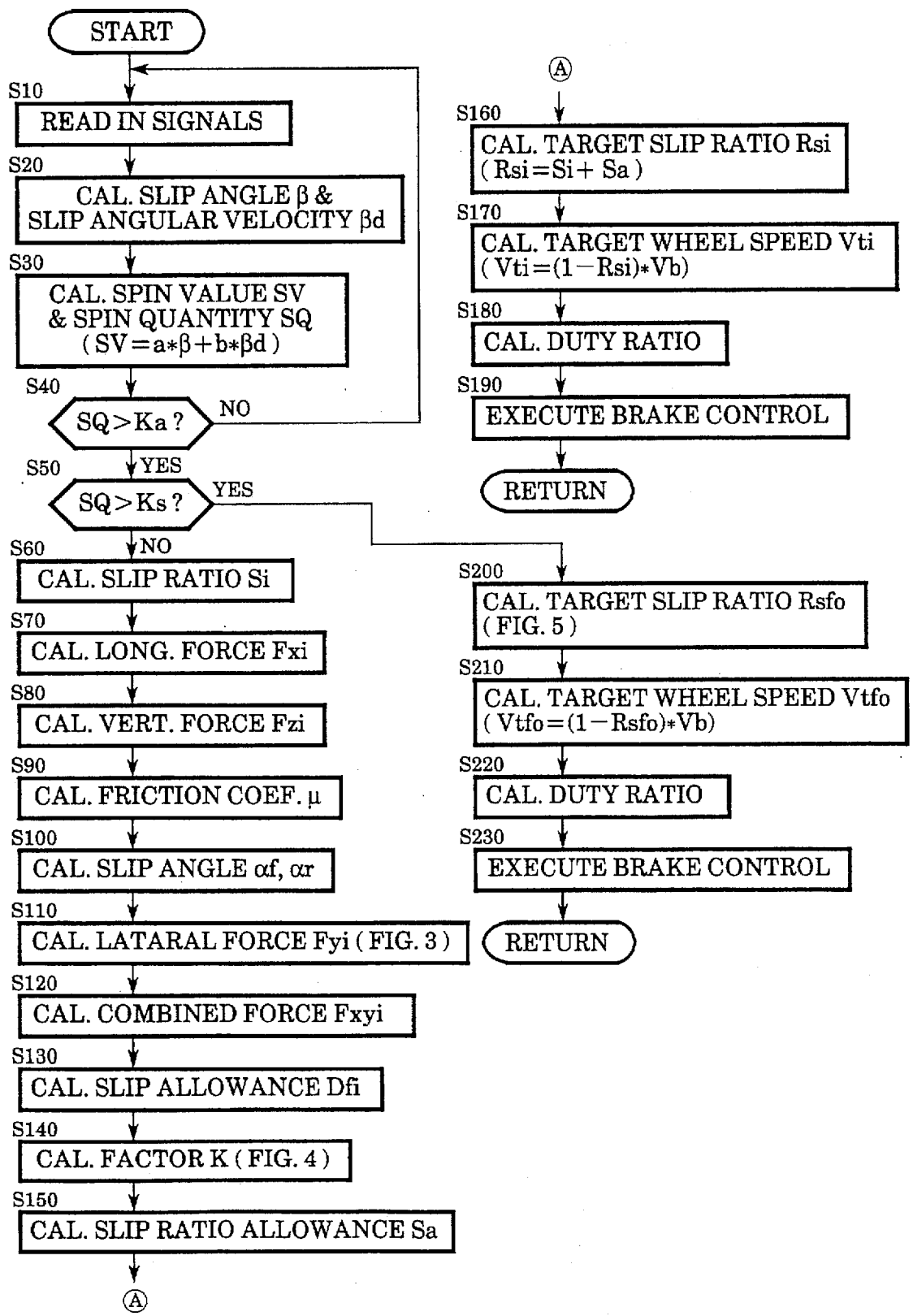
FIG. 2 is a flowchart showing a first embodiment of the spin suppress control routine according to the present invention.
Figure 7:
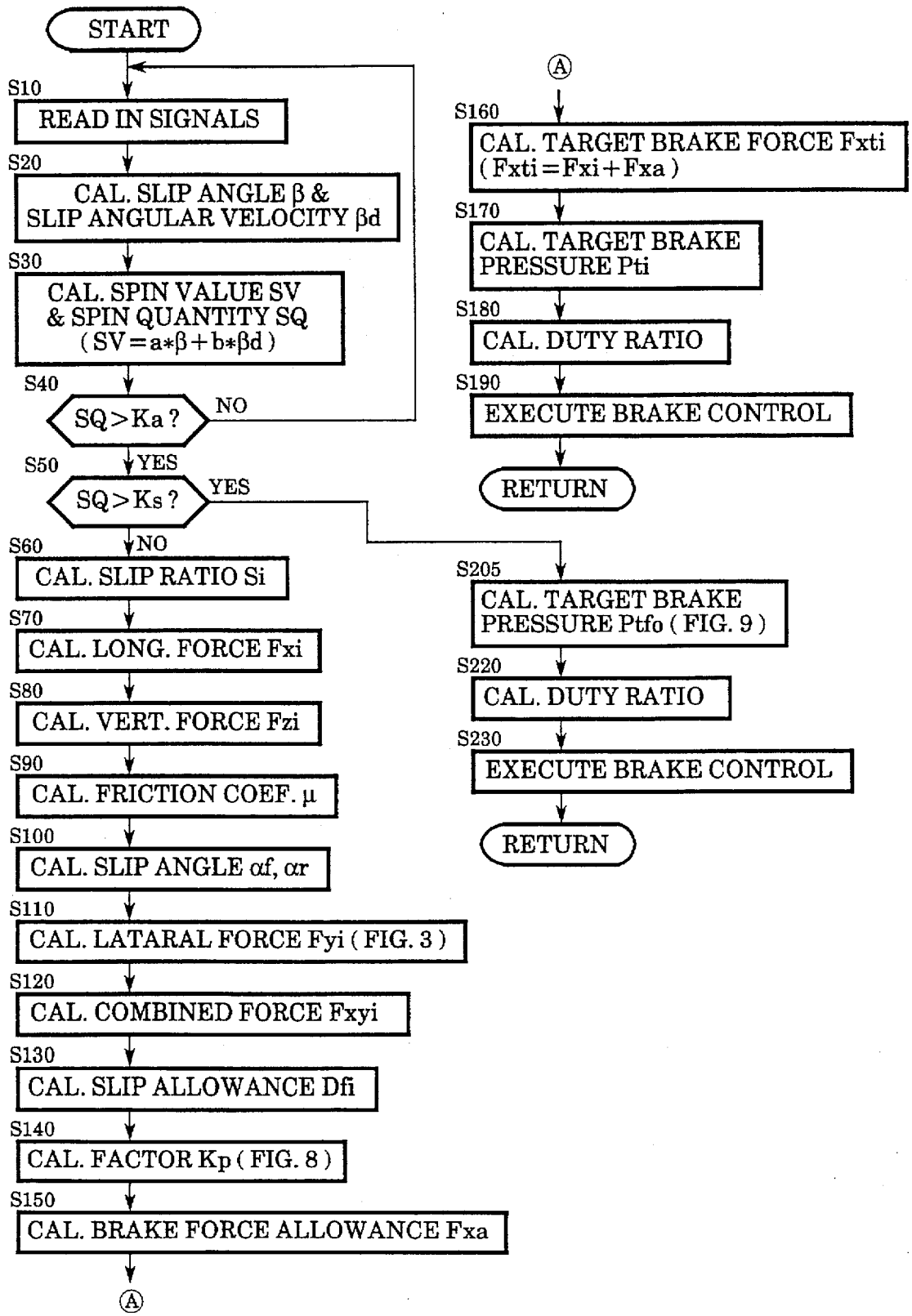
FIG. 7 is a flowchart showing a second embodiment of the spin suppress control routine according to the present invention.

The read only memory of the micro-computer 62 stores such flowcharts as shown in FIGS. 2 and 7 and such maps as shown in FIGS. 3, 4, 5, 8 and 9. The central processing unit conducts various calculations based upon the parameters detected by the above-mentioned various sensors according to those flowcharts and maps as described hereinbelow, so as to obtain a spin quantity for judging and estimating the spin state of the vehicle, and controls the turn behavior of the vehicle based upon the estimated conditions, particularly to suppress the vehicle from spinning, by selectively applying a variable braking force to each of the wheels.

In the following, a first embodiment of the spin suppress control routine will be described with reference to FIG. 2. The control according to the flowchart shown in FIG. 2 is started by a closure of an ignition switch not shown in the figure and carried out repetitively at a predetermined time interval.

In step 10, the signals including the vehicle speed V from the vehicle speed sensor 66 and others are read in. In step 20, side slide acceleration of the vehicle body is calculated from the lateral acceleration Gy, vehicle speed V and yaw rate γ as Vyd=Gy−V*γ; the side slide acceleration Vyd thus obtained is integrated to obtain side slide velocity Vy of the vehicle body; then slip angle of the vehicle body is calculated as a ratio of the side slide velocity Vy to the longitudinal velocity Vx of the vehicle body (=vehicle speed V) as β=Vy/Vx; and then slip angular velocity β d of the vehicle body is calculated as a time-based differential of the slip angle β.

In step 30, taking two positive proportional constants a and b, a weighted sum SV is calculated as a linear sum of the slip angle β and the slip angular velocity β d, such as SV=a*β+b*βd. Then, a spin quantity SQ is determined such that, when the weighted sum SV is positive, the spin quantity SQ is equal to SV, and when the weighted sum SV is negative, the spin quantity SQ is equal to −SV, i.e., mathematically, SQ=|SV|.

Or, alternatively, the spin quantity SQ may be determined to be more sensitive about the variety of turn behavior of the vehicle such that, when the weighted sum SV is positive in conformity with the yaw rate γ being positive, the spin quantity SQ is equal to SV but if the weighted sum SV is negative against the positive yaw rate γ, the spin quantity is made zero, and similarly, when the weighted sum SV is negative in conformity with the yaw rate γ being negative, the spin quantity SQ is equal to −SV but if the weighted sum SV is positive against the negative yaw rate γ, the spin quantity is made zero.

In step 40, it is judged if the spin quantity SQ is greater than a first threshold value Ka. If the answer is no, the control process returns to step 10, it being deemed that that the vehicle is not in a condition to require the spin suppress control of the present invention. If the answer of step 40 is yes, the process proceeds to step 50, and it is judged if the spin quantity SQ is greater than a second threshold value Ks which is greater than the first threshold Ka. If the answer is no, i.e. when the spin quantity is greater than Ka but is not so great as to exceed Ks, the process proceeds to step 60.

In step 60, taking wheel speed (circumferential speed) of a standard wheel such as, for example, a front wheel at the inside of the turn as Vb, slip ratio Si (i=fl, fr, rl, rr) of each wheel is calculated as follows:

$$Si=(Vb-Vi)/Vb$$

Then, in step 70, taking Cs as a constant factor, the longitudinal force acting at each wheel from the road surface due to driving or braking is inversely estimated from the slip ratio as $$Fxi=Cs*Si$$

In step 80, denoting weight of the vehicle body as W, wheel base as L, tread as T, height of the mass center H, longitudinal distances of the front and rear axles from the mass center as Lf and Lr, respectively, and gravitational acceleration as g, vertical forces acting at the respective wheels at the contact point thereof with the road surface are calculated as follows:

$$Fzfl=Kf\{g+(H*Gx)/Lf-(2H*Gy)/T\}$$

$$Fzfr=Kf\{g+(H*Gx)/Lf+(2H*Gy)/T\}$$

$$Fzrl=Kr\{g-(H*Gx)/Lr-(2H*Gy)/T\}$$

$$Fzrr=Kr\{g-(H*Gx)/Lr+(2H*Gy)/T\}$$

wherein $Kf=(W*Lf)/(2g*L)$ and $Kr=(W*Lr)/(2g*L)$.

In step 90, friction coefficient μ between the wheel tire and the road surface is inversely estimated from the longitudinal and lateral forces acting therebetween, such as $$\mu=(Gx^2+Ty^2)^{1/2}/g$$

In step 100, steering angle δ f of the front wheels and steering angle δ r of the rear wheels are calculated based upon steering angle θ (assuming that the steering angles at left and right wheels are the same in front and rear wheels for a convenience), and then slip angle α f of the front wheels and slip angle α r of the rear wheels are estimated as follows:

$$\alpha f=(Vy+Lf*\gamma)/Vx-\delta f$$

$$\alpha r=(Vy-Lr*\gamma)/Vx-\delta r$$

Figure 3:
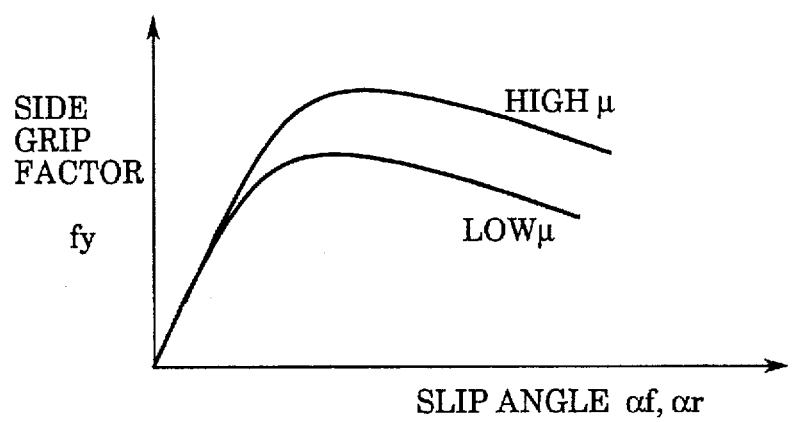
FIG. 3 is a graph showing the general relationship between slip angle $\alpha f$, $\alpha r$ and side grip factor fy of the wheel tires.

In step 110, side grip factor fyi is estimated based upon the slip angle α f, α r according to a map such as shown in FIG. 3, and then lateral forces Fyi of the front and rear wheels are estimated as follows:

$$Fyi=-\text{sign } \alpha f*fyi*Fzi*(1-Si) \ (i=fl, fr)$$

$$Fyi=-\text{sign } \alpha r*fyi*Fzi*(1-Si) \ (i=rl, rr)$$

wherein, "sign" indicates the sign of the slip angles α f and α r.

In step 120, combined forces Fxyi due to the longitudinal forces Fxi and the lateral forces Fyi are calculated as follows:

$$Fxyi=(Fxi^2+Fyi^2)^{1/2}$$

In step 130, slip allowance Dfi is calculated as a difference between the radius of the friction circle μ *Fzi and the combined force Fxyi is calculated with respect to each wheel as follows:

$$Dfi=\mu *Fzi-Fxyi$$

FIGS. 6A, 6B, 6C and 6D illustrate an example of the friction circle and the longitudinal and lateral forces Fxi and Fyi, resulting in the combined force Fxy, applied to each wheel of a four wheel vehicle from the road surface, with respect to its front left, front right, rear left and rear right wheels, when the vehicle is making a left turn. In these figures, 100fl, 100fr, 100rl and 100rr are tires of the front left, front right, rear left and rear right wheels, and circles 102fl, 102fr, 102rl and 102rr are the fiction circles with respect to the corresponding wheels, respectively, illustrating how great the side force based upon the fiction between the tire and the road surface is available around the center point of the contact therebetween. In the shown example, the friction circle of the rear left wheel is the smallest of those of the four wheels, as the vertical force by which each wheel is pressed against the road surface is smallest at the rear left wheel at the shown instant, provided that the tires of the four wheels have the same surface condition. However, although the friction circle 102fl of the front left wheel is next to the smallest, since the combined side force Fxyfl of the front left wheel is greater than the combined side force Fxyrl of the rear left wheel, the slip allowance Dfi is minimum at the front left wheel.

Figure 4:
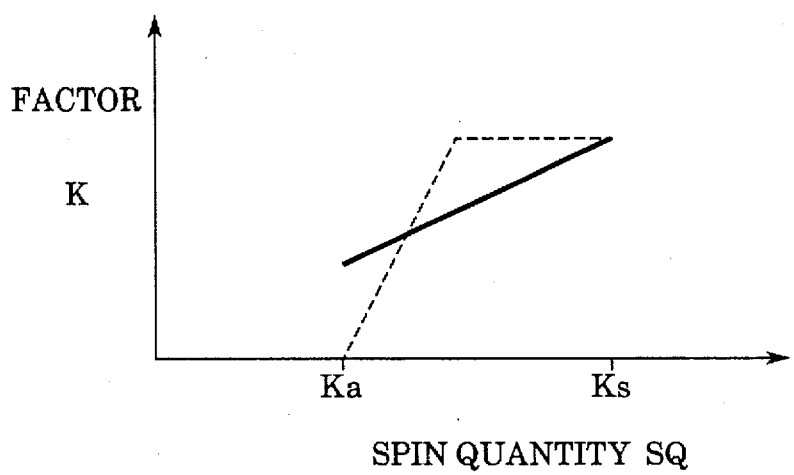
FIG. 4 is a graph showing the relationship between spin quantity SQ and factor K.

In step 140, a factor K is estimated based upon the spin quantity SQ according to a map such as shown in FIG. 4, wherein K is a positive value not exceeding 1. It is primarily intended that the factor K is determined according to a performance line such as shown by the solid line, but it may be modified as shown by the broken line. In any event, as will be appreciated in the following descriptions, the factor K is incorporated to keep the spin suppress braking as low as possible unless the need rises therefor.

In step 150, selecting the minimum of the slip allowances Dfi as Dfmin, slip ratio allowance Sa for the respective wheels is calculated as follows:

$$Sa=K*Dfmi$$

In step 160, the slip ratios Si of the respective wheels calculated in step 60 are added with the slip ratio allowance Sa to provide target slip ratios Rsi for the respective wheels. Then in step 170, target wheels speeds Vti of the respective wheels are inversely estimated from the target slip ratios Rsi as follows:

$$Vti=(1-Rsi)*Vb$$

In step 180, duty ratios for the feed back control of the wheel speed Vi by braking the respective wheels to be effected by the above-mentioned combinations of the normally open type on-off valves 48fl–48rr and the normally closed type on-off valves 50fl–50rr are calculated as follows:

$$Dri=Kp*(Vi-Vti)+Kd*d(Vi-Vti)/dt$$

wherein, Kp and Kd are factors for the proportional and differential terms of the feed back control.

In step 190, control signals are dispatched so that the changeover valves 36f and 36r are changed over to the second changeover position isolating the high pressure passages 20f and 20r from the pedal pressure passages 16f and 16r, respectively, while the normally open type on-off valves 48fl–48rr and the normally closed type on-off valves 50fl–50rr are changed over according to the respective duty ratios Dri, whereby the respective wheels are applied with braking so that the wheel speeds Vi of the respective wheels are brought to the target values Vti by the braking.

Figure 5:
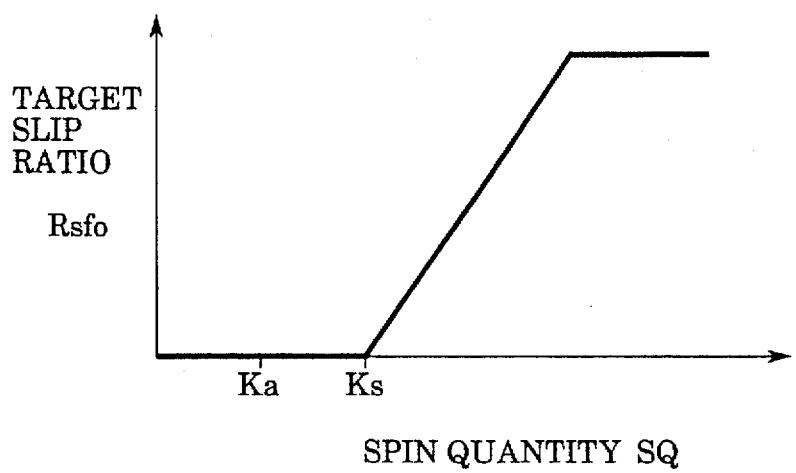
FIG. 5 is a graph showing the relationship between spin quantity SQ and target slip ratio Rsfo.
Figure 6A:
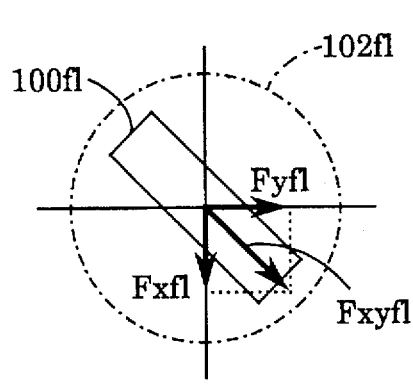
FIGS. 6A, 6B, 6C and 6D are graphic views showing the magnitude of the friction circle and that of the combined side force Fxyi (i=fl, fr, rl, rr) at each of front left and right and rear left and right wheels of a vehicle making a left turn.
Figure 6B:
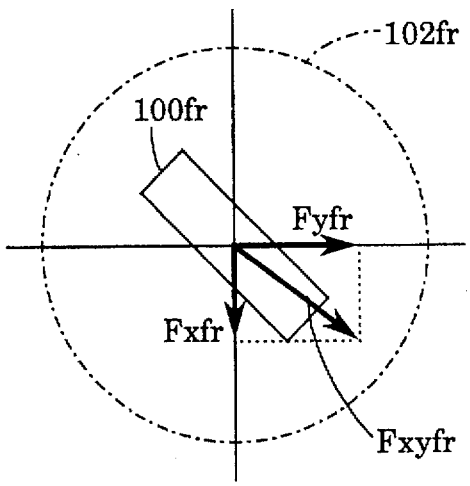
Figure 6C:
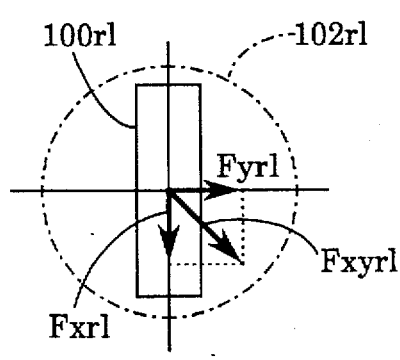
Figure 6D:
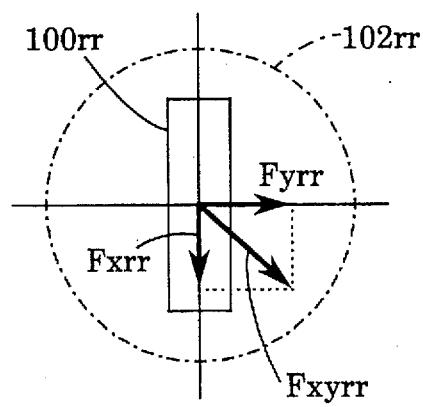

When the answer of the judgment of step 50 is yes, i.e. when it is highly anticipated that the vehicle would spin, the control process proceeds to step 200, and target slip ratio Rsfo for the front wheel at the outside of the turn is directly estimated based upon the spin quantity SQ according to a map such as shown in FIG. 5. Then in step 210, taking and denoting the wheel speed of the front wheel at the inside of the turn as Vb, target wheel speed Vtfo for the front wheel at the outside of the turn is inversely estimated from the target slip ratio Rsfo as follows:

$$Vtfo=(1-Rsfo)*Vb$$

In step 220, the duty ratio for operating the normally open type on-off valve 48fl or 48fr and the normally closed type on-off valve 50fl or 50fr is calculated as follows:

$$Drfo=Kp*(Vfo-Vtfo)+Kd*d(Vfo-Vtfo)/dt$$

In step 230, control signals are dispatched so that the changeover valve 36f is changed over to the second changeover position isolating the high pressure passage 20f from the pedal pressure passage 16f, while the normally open type on-off valve 48fl or 48fr and the normally closed type on-off valve 50fl or 50fr are changed over according to the duty ratio Drfo, whereby the front wheel at the outside of the turn is applied with braking so that its wheel speed Vfo is brought to the target value Vtfo by the braking, thereby generating a corresponding anti-spin moment in the vehicle body.

As will be appreciated from the foregoing descriptions, according to the present invention, when it is anticipated that the vehicle would spin at a relatively low probability such that the spin quantity SQ exceeds the first threshold value Ka but does not exceeds the second threshold value Ks, the four wheels are all braked to increase a common slip ratio such as Sa so that the vehicle is decelerated uniformly at the four wheels with no substantial generation of yaw moment due to the braking, without the slip allowance Dfi being canceled even at the smallest portion thereof. When the vehicle is decelerated in the above-mentioned manner at the four wheels not to generate any substantial yaw moment thereby, the probability of the spinning is correspondingly decreased without substantially affecting the controllability of the vehicle by the driver.

When it is anticipated at a higher probability by the spin quantity SQ exceeding the second threshold value Ks that the vehicle would spin, the braking of the vehicle is concentrated on the front wheel at the outside of the turn, so as more effectively to generate an anti-spin moment in the vehicle, as carried out through steps 200–230. Even in this case, the spin suppress control by the steps 200–230 will be moderated by the precaution braking control by the steps 60–190 are carried out beforehand.

Although in the above-mentioned embodiment the braking at each wheel was applied based upon the sum of the estimated current slip ratio Si and the slip ratio allowance Sa, the braking may be applied to all wheels based upon a common slip ratio calculated as the sum of the minimum of the four slip ratios Si and the slip ratio allowance Sa for convenience.

Further, although the effect of the difference in the turn traces of the wheels between the inside and the outside of the turn and that of the yaw rate on the wheel speed of each wheel are not reflected on in the above-mentioned conversion calculations between the slip ratio and the wheel speed, the precision of those conversion calculations may be more increased by incorporating the turn radius of the vehicle, the tread, the yaw rate and other parameters influential on the relation between the slip ratio and the wheel speed. In this connection, although in the above-mentioned embodiment the vehicle speed Vb of the front wheel at the inside of the turn was made a standard wheel speed, a standard wheel speed may be obtained based upon a vehicle speed detected by a supersonic vehicle speed sensor acting against the road surface.

Figure 8:
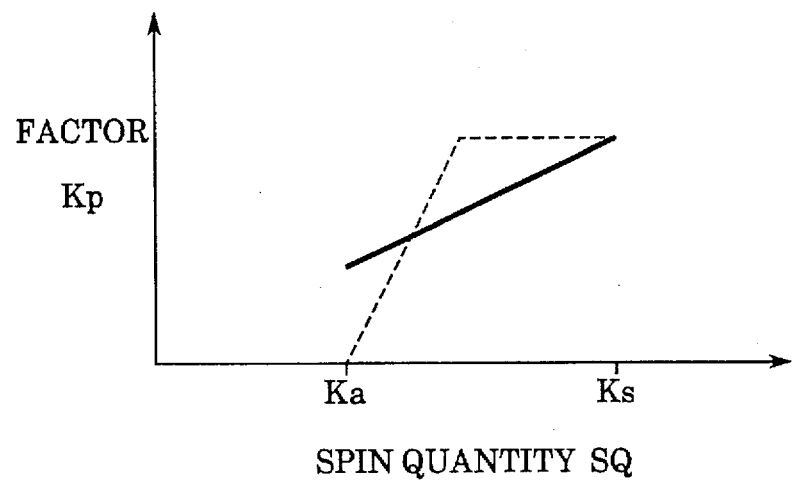
FIG. 8 is a graph showing the relationship between spin quantity SQ and factor Kp with respect to said second embodiment of the spin suppress control routine according to the present invention.

Although in the above-mentioned first embodiment the final step of estimating the duty ratio Dri or Drfo is dependent upon a feedback control of the wheel speed, such a final estimation for obtaining the duty ratio for operating the serial connection of the normally open type on-off valve and the normally closed type on-off valve may be obtained based upon a feedback control of the hydraulic pressure supplied to each of the wheel cylinders 54fl–54rr, depending upon the pressure sensors 80fl–80rr shown in FIG. 1 as a substitution of the wheel speed sensors 74fl–74rr. In this case, the flowchart of FIG. 2 will be modified as shown in FIG. 7. As will be obvious for those skilled in the art, in the flowchart of FIG. 7 steps 140–190 and steps 205–230 are modified so as to adapt the estimation processes to the control of the brake hydraulic pressure. In more detail, in step 140 of FIG. 7, factor Kp is obtained according to a map such as shown in FIG. 8 based upon the spin quantity SQ. The performance of Kp may be similar to that of K shown in FIG. 4. Kp is also a positive value not greater than 1. Further, although it is primarily intended that the factor Kp is determined according to a performance line such as shown by the solid line, it may be modified as shown by the broken line. In any event, the factor Kp is incorporated to keep the spin suppress braking as low as possible unless the need rises therefor.

In step 150 of FIG. 7, brake force allowance Fxa is calculated as follows:

$$Fxa = Kp * Dfmin$$

In step 160 of FIG. 7, target brake forces Fxti of the respective wheels are calculated as a sum of Fxi calculated in step 70 and Fxa, and then in step 170 of FIG. 7, target brake pressures (hydraulic pressure) Pti of the respective wheels are estimated from the target brake forces Fxti according to a map, not shown, interrelating the brake force and the corresponding brake pressure. Then in step 180 of FIG. 7, duty ratios Dri for the feedback control of the brake pressure Pi at the respective wheel cylinder to be effected by the normally open type on-off valves 48fi–48rr and the normally closed type on-off valves 50fl–50rr are estimated as follows:

$$Dri = Kpp*(Pi-Pti) + Kpd*d(Pi-Pti)/dt$$

wherein Kpp and Kpd are factors for the proportional and differential terms for the feedback control.

Then in step 190 of FIG. 7, control signals are dispatched for the changeover valves 36f and 36r, the normally open type on-off valves 48fl–48rr and the normally closed type on-off valves 50fl–50rr in the same manner as in the embodiment shown in FIG. 2.

Figure 9:
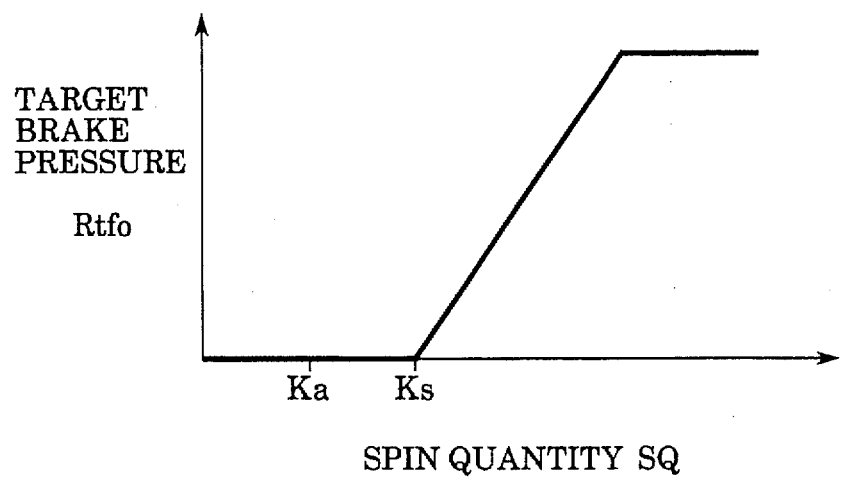
FIG. 9 is a graph showing the relationship between spin quantity SQ and target slip ratio Rtfo.

Similarly, in step 205, target brake pressure Ptfo for the front wheel at the outside of the turn is estimated based upon the spin quantity SQ according to a map such as shown in FIG. 9, and in step 220 of FIG. 7, duty ratio Drfo the feedback control of the brake pressure Pfo of the front wheel at the outside of the turn to be effected by the normally open type on-off valve 48fl or 48fr and the normally closed type on-off valve 50fl or 50fr is calculated as follows:

$$Drfo = Kpp*(Pfo-Ptfo) + Kpd*d(Pfo-Ptfo)/dt$$

In step 230 of FIG. 7, the control signals are dispatched to the hydraulic system in the same manner as in step 230 of FIG. 2.

Although in the above-mentioned second embodiment the braking at each wheel was applied based upon the sum of the estimated current brake force Fxi and the brake force allowance Fxa, the braking may be applied to all wheels based upon a common brake force calculated as the sum of the minimum of the four brake forces Fxi and the brake force allowance Fxa for convenience.

Further, although in the second embodiment the longitudinal forces Fxi were calculated from the slip ratios in step 70 in the same manner as in the first embodiment, the longitudinal forces Fxi may each be calculated from the pressure Pi, based upon radius R of each tire and a constant Cb, as follows:

$$Fxi = (Cb/R) * Pi$$

Although the present invention has been described in detail with respect to some embodiments thereof, it will be apparent for those skilled in the art that various modifications are possible without departing from the spirit of this invention.

We claim:

1. A spin suppress control device of a vehicle having a vehicle body and wheels, comprising a means for estimating a spin quantity of the vehicle to represent a liability of a spinning thereof, and a means for selectively and variably braking each of said wheels according to said spin quantity, wherein the device actuates said braking means so as to decelerate the vehicle within a range of generating no substantial yaw moment in the vehicle by the actuation of said braking means when said spin quantity exceeds a first threshold value therefor, and to provide the vehicle with an anti-spin moment when said spin quantity exceeds a second threshold value therefor greater than said first threshold value.

2. A spin suppress control device according to claim 1, wherein the device comprises a means for detecting a value of the slip ratio at a point of contact of each of said wheels with a road surface, a means for estimating a radius of the friction circle at each of said contact points, a means for estimating a side force acting to each of said wheels from the road surface, a means for calculating a slip allowance of each of said wheels as a difference between said radius value of the friction circle and said side force with respect to each of said wheels, and a means for calculating a target value of the slip ratio of each of said wheels as a sum of each of said detected values of the slip ratio and a modification value based upon the minimum of said slip allowances, and brakes each of said wheels such that the slip ratio of each of said wheels is brought to said target value therefor when said spin quantity exceeds said first threshold value.

3. A spin suppress control device according to claim 2, wherein said modification value is a product of said slip allowance and a proportional factor which is increased according to increase of said spin quantity.

4. A spin suppress control device according to claim 1, wherein the device provides the vehicle with said anti-spin moment by particularly braking one of said wheels located at a front outside of the vehicle in a turn thereof.

5. A spin suppress control device according to claim 1, wherein said spin quantity is estimated using a weighted sum of a value of the slip angle of the vehicle body and a time-based differential of said slip angle when said weighted sum is positive, and is equal to the absolute value of said weighted sum when said weighted sum is negative.

6. A spin suppress control device according to claim 1, wherein said spin quantity is estimated using a weighted sum of a value of the slip angle of the vehicle body and a time-based differential of said slip angle when said weighted sum is positive in conformity with the yaw rate of the vehicle being positive but is zero when said weighted sum is negative against the positive yaw rate and is equal to the absolute value of said weighted sum when said weighted sum is negative in conformity with the yaw rate being negative but is zero when said weighted sum is positive against the negative yaw rate.

* * * * *